United States Patent [19]

Fischer

[11] 4,091,947
[45] May 30, 1978

[54] TRACTOR MOUNTED MULTIPLE BALE CARRIER

[75] Inventor: Raymond C. Fischer, Hinsdale, Ill.

[73] Assignee: International Harvester Company, Chicago, Ill.

[21] Appl. No.: 743,836

[22] Filed: Nov. 22, 1976

[51] Int. Cl.² ............................................. B60P 1/16
[52] U.S. Cl. .................................. 214/766; 214/144
[58] Field of Search ............... 214/131 R, 144, 350, 214/352, 353, 766; 56/473.5, 480

[56] References Cited

U.S. PATENT DOCUMENTS

| 1,170,654 | 2/1916 | Martin | 214/144 X |
| 2,727,640 | 12/1955 | McClenny | 214/766 |
| 2,755,944 | 7/1956 | Wetz | 214/131 R |

FOREIGN PATENT DOCUMENTS 235,582  9/1961  Australia .......................... 214/131 R Primary Examiner—L. J. Paperner Attorney, Agent, or Firm—Neal C. Johnson; F. David AuBuchon

[57] ABSTRACT

A bale pickup and carrier structure mounted on the 3-point hitch of a tractor for picking up and carrying three or four cylindrical bales of substantial size and weight. The carrier consists of a transversely elongated frame having several pairs of bale supporting tines extending rearwardly for carrying several large bales in side-by-side relation. The carrier further includes a subassembly having a pair of bale-supporting tines extending forwardly from the frame outside of one of the rear wheels of the tractor. Accordingly, a bale can be carried alongside of the tractor in addition to the bales in the side-by-side row. The entire carrier is raised and lowered through conventional control of the 3-point hitch of the tractor. In addition, the subassembly is pivotable relative to the frame to a raised position wherein a bale thereon can be held clear of the ground during retrieval and unloading of the remaining bales.

2 Claims, 3 Drawing Figures

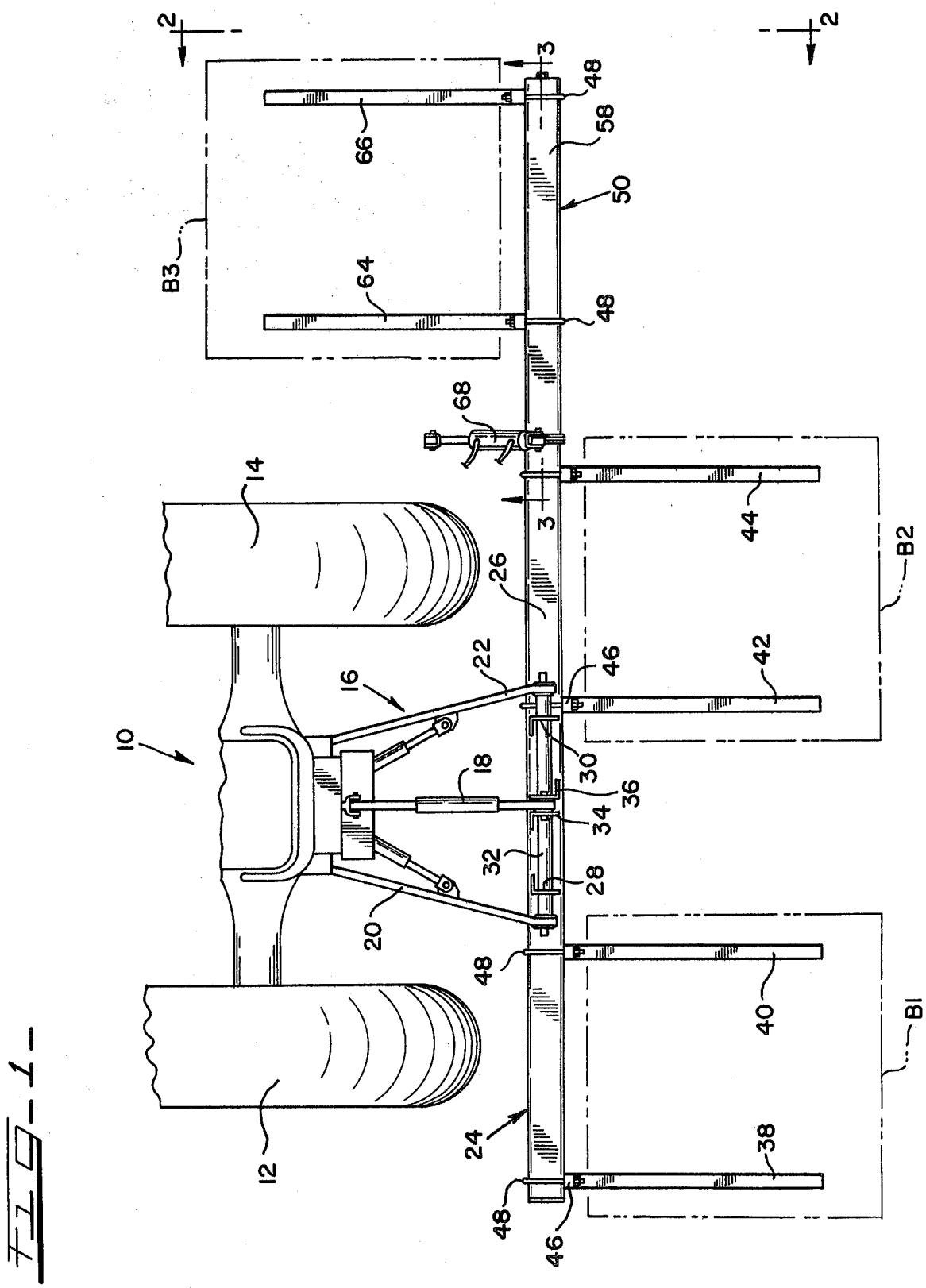

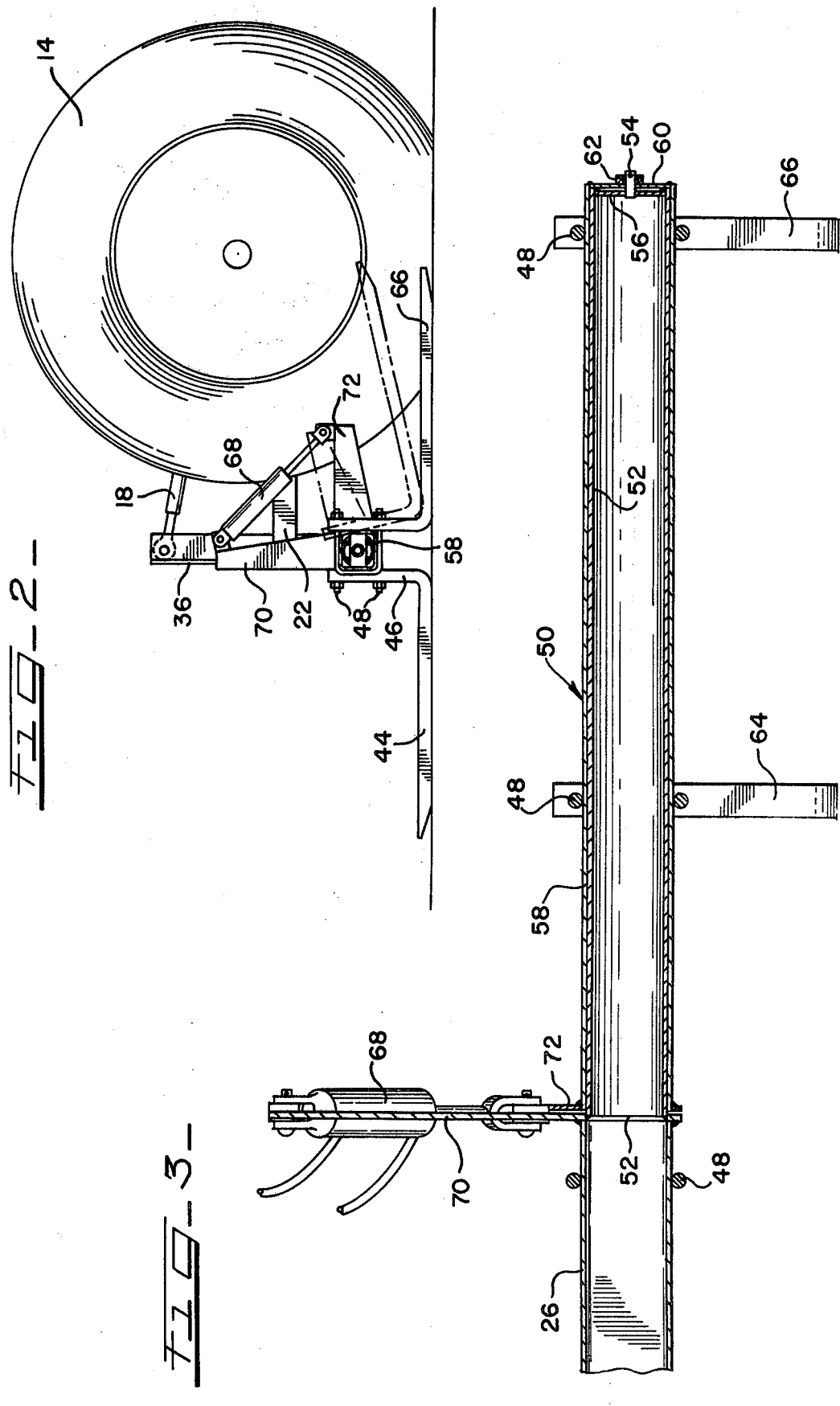

TRACTOR MOUNTED MULTIPLE BALE CARRIER

BACKGROUND OF THE INVENTION

1. Field of the Invention

The invention relates generally to carriers for multiple bales and more particularly to a carrier mounted on the 3-point hitch of a tractor including means for carrying a bale alongside the tractor.

2. Prior Art

With the growth in recent years in the use of hay balers for large cylindrical bales a wide variety of equipment has been devised for picking up, carrying, and handling such bales. Trailer-type carriers for single bales are exemplified in U.S. Pat. Nos. 3,938,682 and 3,935,954. Trailer-type carriers for multiple bales are exemplified in U.S. Pat. Nos. 3,952,895, 3,941,265, and 3,826,515. Tractor-mounted carriers are shown in U.S. Pat. Nos. 3,934,726 and D 239,194.

In the latter category, while the typical modern agricultural-type tractor has the floatation and structural capacity to easily carry several large bales, a very practical problem exists with known 3-point hitch mounted carriers. That is, several large bales carried behind the tractor can create an excessive rear tipping moment about the rear wheels of the tractor. The problem then is to utilize the load-carrying capacity of a tractor in carrying several large bales without adversely affecting stability and safety of operation.

SUMMARY

The invention provides a multiple bale carrier mountable on the 3-point hitch of a tractor for picking up, carrying, and unloading a plurality of large bales. The carrier includes means for carrying a bale alongside the tractor, as well as one or more behind it, thus reducing the possibility of rearward tipping even when a heavy load is carried.

A basic object of the invention is to effectively utilize the load carrying capacity of a tractor in carrying a plurality of large heavy bales.

Another object ancillary to the foregoing object is to accomplish that result without modification to the tractor.

A further object is to provide a tractor-mounted carrier capable of supporting several large bales without creating excessive rearward tipping moments to provide stable and safe operation.

BRIEF DESCRIPTION OF THE DRAWINGS

FIG. 1 is a plan view of the bale carrier of the invention;

FIG. 2 is a fragmentary side elevation view taken along lines 2—2 of FIG. 1; and FIG. 3 is an enlarged sectional view taken along lines 3—3 of FIG. 1.

DESCRIPTION OF THE PREFERRED EMBODIMENT

Referring first to FIG. 1 there is shown a tractor 10 of the agricultural type including a pair of rear drive wheels 12 and 14. A three-point hitch assembly shown generally at 16 projects rearwardly from the tractor 10 between the drive wheels 12 and 14. The hitch assembly 16 is of conventional construction including an upper link 18 and a pair of hydraulically liftable lower links 20 and 22. The hitch assembly 16 may be constructed and controlled in accordance with the arrangement shown in greater detail in U.S. Pat. No. 3,239,013.

In accordance with the invention a multiple bale carrier 24 is mounted on the hitch assembly 16 of the tractor. A basic component of the carrier 24 is an elongated frame 26 of tubular construction extending tranversely of the forward direction of travel of the tractor. The frame 26 is preferably rectangular in cross section. A pair of L-section members 28 and 30 is welded to the top of the frame 26 in spaced relation and provide a rigid support for a rod 32 disposed a short distance above the frame 26 parallel thereto. As seen in FIG. 1 the lower links 20 and 22 are pivotally connected to the respective ends of the rod 32. Another pair of L-section members 34 and 36 is welded to the top of frame 26 to form a mast structure extending upwardly above the pivot connections of the links 20 and 22 and midway therebetween. The rearward end of the upper link 18 is pivotally connected to the top of the mast defined by the members 34 and 36.

Bale-supporting tines are shown in FIG. 1 at 38, 40, 42 and 44 mounted on and extending rearwardly from the frame 26. Each of the tines includes a vertical shank portion 46 secured to the frame 26 by a U-bolt assembly 48. As evident in FIG. 1 the tines 38 and 40 and the tines 42 and 44 are arranged in respective pairs to support respective bales B1 and B2 thereon.

The bale carrier of the invention includes a subassembly shown generally at 50 mounted on an end of the frame 26 for carrying a bale B3 forwardly of the bales B1 and B2 and alongside the tractor. As shown in greater detail in FIGS. 2 and 3 the subassembly 50 includes a cylindrical tube 52 welded to the end of the tubular frame 26 and extending coaxially therewith transversely well beyond the tractor drive wheel 14 (FIG. 1). A pin 54 is welded to a plate 56 which is in turn welded to the outer end of the tube 52.

The subassembly 50 further includes an elongated tube 58 of rectangular section rotatably mounted on the cylindrical tube 52. A plate 60 is welded to the outer end of the tube 58 and has an opening defined therethrough for receiving the pin 54 upon assembly of the tube 58 onto the tube 52. A washer 62 and a cotter pin (not shown) on the pin 54 complete the arrangement for retaining the tube 58 on the tube 52.

Bale-supporting tines 64 and 66 are secured to the tube 58 and extend forwardly therefrom for supporting the bale B3 outboard of the tractor drive wheel 14. The tines 64 and 66 are identical in construction with the tines 38, 40, 42 and 44 and are likewise secured in place by U-bolt assemblies 48.

As shown generally in FIG. 1 and in more detail in FIGS. 2 and 3, a hydraulic piston-cylinder unit 68 is connected between the frame 26 and tube 58 for raising and lowering the tines 64 and 66 about the longitudinal axis of the frame 26. The unit 68 is pivotally connected at one end to a vertical plate 70 welded to the end of the tube 26. The other end of the unit 68 is pivotally connected to an arm 72 welded to the tube 58 and projecting forwardly therefrom as shown in FIG. 2. It will be understood that the hydraulic unit 68 is hydraulically connected to the usual hydraulic power system of the tractor 10 and is selectively actuated through a control valve common in such systems.

In operation the hitch assembly 16 is actuated to lower the bale carrier and then the hydraulic unit 68 is extended to swing the tines 64 and 66 into the solid line position of FIG. 2. The machine is then driven forwardly to push the tines under the bale B3. The unit 68 is then retracted to raise the tines 64 and 66 to the dotted line position to hold the bale B3 clear of the ground to enable subsequent loading of the bales B1 and B2 without ground interference with the bale B3. It will be apparent that the bales B1 and B2 are successively loaded onto the respective pairs of tines by simply backing the machine to push the tines under the bales. When fully loaded the hitch assembly 16 is actuated to raise the entire bale carrier to a raised transport position wherein all the bales are held clear of the ground.

By the foregoing Applicant has provided an arrangement designed to fulfill the objects of the invention.

What is claimed is:

1. A multiple bale carrier adapted for mounting on a tractor having a pair of rear drive wheels and a three-point hitch between the drive wheels, said carrier comprising:

an elongated frame mounted on the three-point hitch behind the drive wheels and extending transversely to the forward direction of travel of the tractor;

at least one pair of bale-supporting tines on said frame extending rearwardly for supporting a bale thereon;

means for selectively lowering said frame to a bale pickup position wherein said tines may be inserted under a bale when the tractor is moved rearwardly and for selectively raising said frame to a bale transport position;

a bale carrier subassembly mounted on said frame and including a pair of bale-supporting tines extending forwardly of said frame outboard of one of said drive wheels so that a bale may be carried thereon alongside the tractor, said frame including an elongated tube having a cylindrical end section extending transversely beyond said one of said drive wheels, said subassembly being mounted on said cylindrical end section for pivotal movement about the longitudinal axis of said end section;

and means powered by said tractor interconnected between said tube and said subassembly for pivoting the subassembly to raise and lower a bale carried thereon outboard of said one drive wheel.

2. A multiple bale carrier adapted for mounting on a tractor having a pair of rear drive wheels and a 3-point hitch between the drive wheels, said carrier comprising:

an elongated frame mounted on the 3-point hitch behind the drive wheels and extending transversely to the forward direction travel of the tractor;

a plurality of pairs of bale-supporting tines transversely spaced on said frame extending rearwardly for supporting a respective plurality of bales thereon in side-by-side relation;

means for selectively lowering said frame to a bale pickup position wherein said tines may be inserted under bales when the tractor is moved rearwardly and for selectively raising said frame to a bale transport position;

a bale carrier subassembly mounted on said frame and including a pair of bale-supporting tines extending forwardly of said frame outboard of one of said drive wheels for carrying a bale alongside the tractor and forwardly of the side-by-side bales, said frame including an elongated tube having a cylindrical end section extending transversely beyond said one of said drive wheels, said subassembly being mounted on said cylindrical end section for pivotal movement about the longitudinal axis of said end section;

and means powered by said tractor interconnected between said tube and said subassembly for pivoting the subassembly to raise and lower a bale carried thereon outboard of said one drive wheel.

* * * * *